United States Patent [19]
Ansart et al.

[11] Patent Number: 5,560,197
[45] Date of Patent: Oct. 1, 1996

[54] FIXING ARRANGEMENT FOR A THERMAL PROTECTION TILE IN A COMBUSTION CHAMBER

[75] Inventors: Denis R. H. Ansart, Bois le Roi; Didier Hernandez, Bretigny S/Sorge; Rodolphe Martinez, Perigny S/Yerres, all of France

[73] Assignee: Societe Nationale d'Etude et de Construction de Moteurs d'Aviation "Snecma", Paris, France

[21] Appl. No.: 533,277

[22] Filed: Sep. 25, 1995

Related U.S. Application Data

[62] Division of Ser. No. 361,587, Dec. 22, 1994, Pat. No. 5,501,071.

[30] Foreign Application Priority Data

Dec. 22, 1993 [FR] France .................. 93 15391

[51] Int. Cl.⁶ .................. F02C 3/14; F02C 7/20
[52] U.S. Cl. .................. 60/39.32; 60/752
[58] Field of Search .................. 60/39.31, 39.32, 60/752, 753, 755, 756, 757; 411/521, 522, 523

[56] References Cited

U.S. PATENT DOCUMENTS

| | | | |
|---|---|---|---|
| 4,848,089 | 7/1989 | Cramer | 60/752 |
| 5,265,411 | 11/1993 | Belsom | 60/752 |
| 5,337,583 | 8/1994 | Giles et al. | 60/39.32 |
| 5,435,139 | 7/1995 | Pidcock et al. | 60/752 |

*Primary Examiner*—Louis J. Casaregola
*Attorney, Agent, or Firm*—Oblon, Spivak, McClelland, Maier & Neustadt, P.C.

[57] ABSTRACT

An arrangement for removably fixing a thermal protection tile on the inside of a combustion chamber wall is described. In one form the tile is provided with a fixing stud which is arranged to pass through a hole in the wall, and a split washer is inserted under the head of the stud to lock the assembly to the wall. In another form the tile is provided with a fixing stud having a head which is arranged to be inserted in a socket welded to the inner surface of the wall and which is locked in place by a stop inserted through a hole in the wall to abut the edge of the head and prevent its removal from the socket.

3 Claims, 3 Drawing Sheets

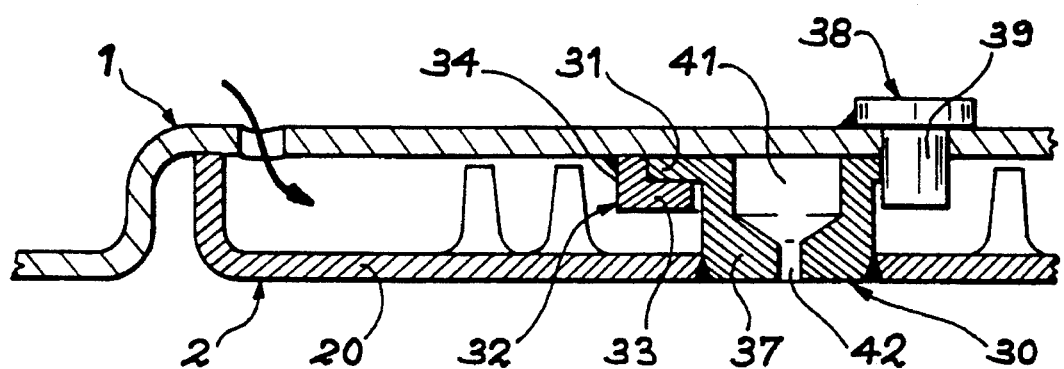
FIG. 4
FIG. 5
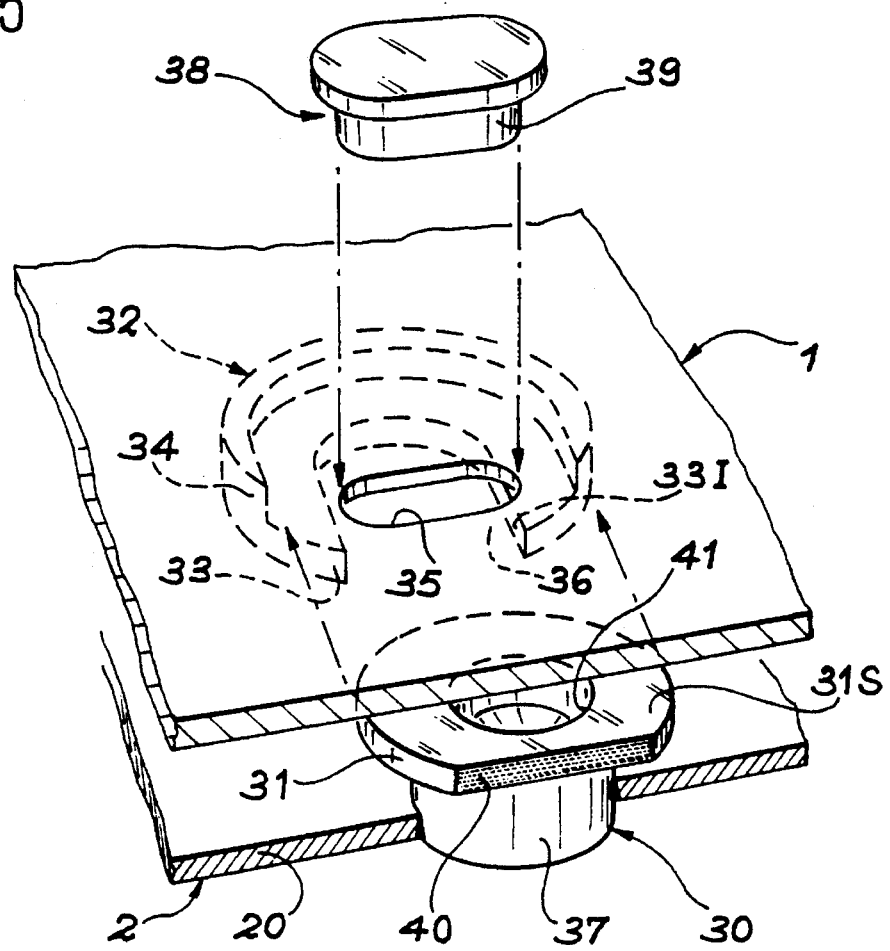

5,560,197

FIXING ARRANGEMENT FOR A THERMAL PROTECTION TILE IN A COMBUSTION CHAMBER

This is a division, of application Ser. No. 08/361,587 filed on Dec. 22, 1994 (U.S. Pat. No. 5,501,071).

BACKGROUND OF THE INVENTION

1. Field of the Invention

The invention relates to the provision of thermal protection inside combustion chambers, especially those in turbomachines such as turbojet engines, and in particular it relates to the fixing of thermal protection tiles placed inside such combustion chambers.

The power developed by a turbomachine is directly related to the temperature of the gases entering the turbine. To increase the power of such turbomachines, manufacturers have therfore created combustion chambers capable of generating very high output temperatures, for example close to or even exceeding 1,500° C. for military turbojet engines and 1,350° C. for civil turbojet engines. Moreover, the fuel consumption of such engines is very high at these operating temperatures. However, it decreases as the compression ratio increases, and modern turbojet engines therefore tend to have a higher compression ratio.

These and other considerations have thus led to turbojet engine designers to seek to improve the thermal protection of the walls constituting the combustion chambers, with the aim of lengthening the life of the chambers.

2. Summary of the Prior Art

One of the solutions devised to protect the walls of combustion chambers involves fitting them with a second wall on the inside thereof. This second wall is placed at a distance from the outer wall so as to create an annular space for the flow of cooling air drawn from outside the chamber. Examples of this solution are disclosed in GB Patent 2173891 and U.S. Pat. No. 4,302,941. To permit repair of this type of chamber, the second wall exposed to the full heat of the chamber is constituted by juxtaposed elements, commonly called "tiles", which are held slightly spaced from the outer wall, for example by means of spikes.

In the majority of cases, these tiles are fixed in a permanent manner. Consequently, dismantling is either very difficult or impossible. Moreover, assembly itself is not always easy.

It is an object of the invention therefore to provide a tile fixing arrangement which avoids these drawbacks.

SUMMARY OF THE INVENTION

Accordingly, the invention provides an arrangement for removably fixing a thermal protection tile on the inside of a combustion chamber wall.

In a first aspect of the invention this fixing arrangement comprises:

at least one stud fixed to a plate portion of said tile, said stud having a shank by which said stud is fixed to said plate portion and a flat head spaced outwardly from said plate portion, said head having parts which project laterally further from said shank than other parts of said head;

means defining a hole in said combustion chamber wall having a shape corresponding to that of said head of said stud so that said head is able to pass through said hole, the distance between the under surface of said head and the outer surface of said plate portion facing said combustion chamber wall when said head is fully inserted through said hole being greater than the distance between the outer surface of said combustion chamber wall and said outer surface of said plate portion so as to define a clearance between said head and said outer surface of said wall; and a split washer having a raised edge which allows said washer to be placed around said shank in said clearance between said head and said outer surface of said combustion chamber wall and which is turned down, after rotation of said washer, to retain said washer in place and thereby secure said head, and hence said tile, to said combustion chamber wall.

In this case, the diameter of the shank of the stud is preferably equal to the width of the narrow section of the head of the stud.

It is preferable in this case that the shape of the head and of the hole be oblong.

In a second aspect of the invention the fixing arrangement comprises:

at least one stud fixed to a plate portion of said tile, said stud having a shank by which said stud is fixed to said plate portion and a flat head spaced outwardly from said plate portion, said head projecting laterally from said shank;

a socket fixed to the inner surface of said combustion chamber wall, said socket having a shape which corresponds to that of said head of said stud and having means defining an opening at one side thereof to permit entry of said head into said socket to attach said stud, and hence said tile, to said wall;

means defining a hole in said combustion chamber wall positioned eccentrically relative to the axis of said stud when said head is received in said socket; and a stop which is inserted into said hole from outside said combustion chamber wall, said stop having a portion which protrudes from said inner surface of said wall to abut an edge of said head of said stud in said socket and thereby secure said head in said socket.

In this case it is preferable that the hole is oblong and that the shape of the head is such that the edge which is abutted by the portion of the stop protruding through the hole is flat.

Generally, the tile preferably has spikes on the outer surface of its plate portion for improving heat exchange between the tile and the air which, in use, flows between the combustion chamber wall and the tile.

BRIEF DESCRIPTION OF THE DRAWINGS

FIG. 4 is a view similar to FIG. 2 but showing a second embodiment of the fixing arrangement of the invention; and FIG. 5 is an exploded view illustrating the assembly of the fixing arrangement shown in FIG. 4.

DESCRIPTION OF THE PREFERRED EMBODIMENTS

Figure 1:
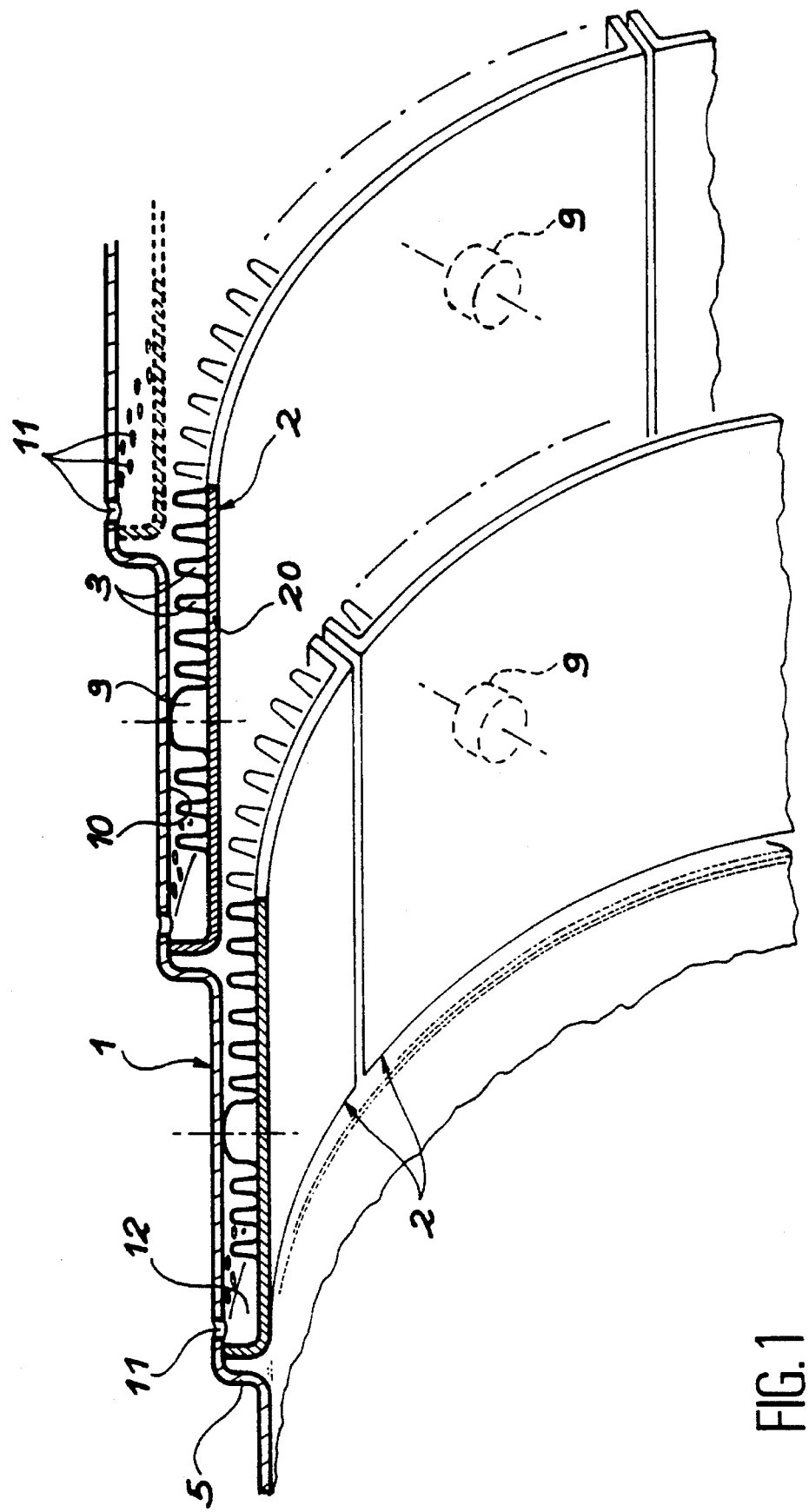
FIG. 1 is a part sectional, part perspective view of a portion of a combustion chamber fitted with thermal protection tiles by a fixing arrangement (not shown) in accordance with the invention.

FIG. 1 shows several tiles 2 fitted inside the wall 1 of a combustion chamber of a turbojet engine, each tile consisting mainly of a plate 20 provided with spikes 3 and positioning pegs 9. The tiles are kept spaced from the wall 1 by means of the heads of the positioning pegs 9 bearing against the inner surface 10 of the wall 1, thereby forming a space 12 between the wall 1 and the tiles 2. Holes 11 are provided in the wall 1 opposite the upstream portion of each tile 2 so that air is able to flow into each of the spaces 12. The purpose of this flow is to improve the cooling air flow for the tiles 2, and the cooling itself is improved by the presence of the spikes 3 extending radially from the plate 20 throughout the space 12. However, the top of each spike 3 is not in contact with the wall 1, so as to allow radial expansion between these spikes 3 and the wall 1. A clearance of the order of 0.2 to 0.3 mm between the top of the spikes 3 and the wall 1 is sufficient.

As will be observed from FIG. 1, the tiles are arcuately shaped and it will be appreciated that with sufficient tiles the whole of the inner surface 10 of the wall can be covered. It will also be noted that the tiles are overlapping, the wall 1 having steps 5 accommodating successive rings of tiles so that the tiles of each ring overlap the upstream ends of the tiles of the succeeding ring.

Figure 2:
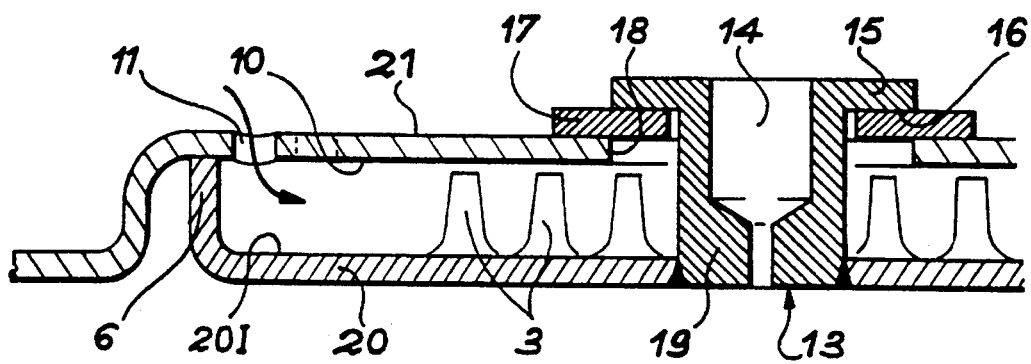
FIG. 2 is a sectional view showing a tile attached to the combustion chamber wall by a first embodiment of the fixing arrangement of the invention.
Figure 3:
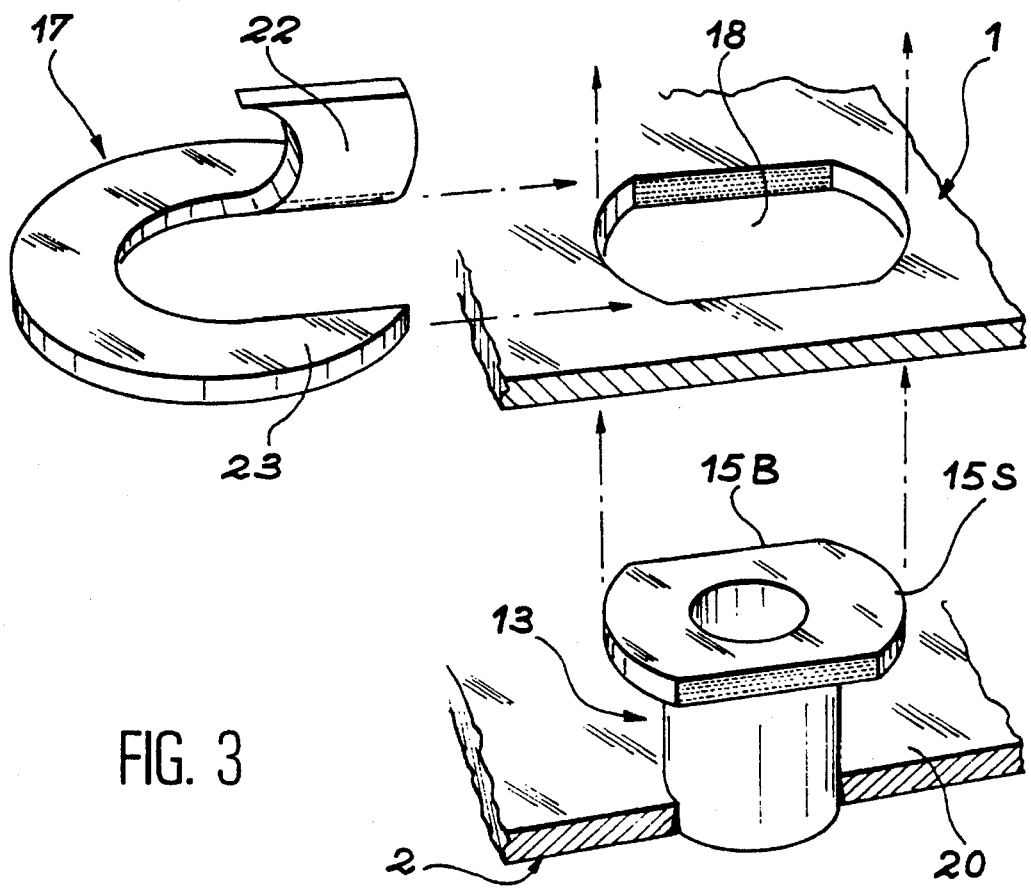
FIG. 3 is an exploded view illustrating the assembly of the fixing arrangement shown in FIG. 2.

In the tile fixing arrangement shown in FIGS. 2 and 3, the plate 20 of each tile has a hole in which the shank 19 of a fixing stud 13 is fixed, e.g. by welding, at the foot of the shank. The stud projects from the plate 20 on the same side as the spikes 3, but is higher and has a flat head 15 projecting laterally from its shank 19. The shape of the head 15 is such that it has opposite end parts 15S which project further from the shank 19 than the sides 15B. Indeed, it will be noted that the width of the narrower section of the head 15, i.e. between the sides 15B is equal to the diameter of the shank 19 of the stud.

The head 15 of the stud 13 is arranged to be fixed to the wall 1, and for this purpose the wall is provided with a hole 18 having a shape corresponding to that of the head 15 so that the head can pass through it to protrude beyond the outer surface 21 of the wall 1. The distance separating the under surface 16 of the head 15 from the outer surface 20I of the plate 20 facing the wall 1 when the head is inserted through the hole 18 is greater than the distance separating the said outer surface 20I of the plate 20 from the outer surface 21 of the wall 1 so that a clearance space is formed between the head 15 of the stud 13 and the outer surface 21 of the wall 1. When the stud has been inserted through the hole 18 as far as possible, as determined by the out-turned upstream end 6 of the plate 20 coming to bear against the inner surface of the wall 1, the clearance space between the head and the outer surface 21 corresponds to the thickness of a retaining washer 17 so that the latter can be inserted between the lower surface 16 of the head 15 and the outer surface 21 of the wall 1.

Referring to FIG. 3, it will be observed that this washer 17 is split and that one of the edges 22 of the split is displaced out of the general plane of the washer 17 to an extent sufficient for the shank 19 of the stud 13 to be inserted through the split into the central hole of the washer.

Thus, as FIG. 3 shows, the first step in fixing a tile 2 to the wall 1 consists of passing the head of the stud 15 through the hole 18 in the wall 1. Then, the washer 17 is inserted underneath the head 15 in a direction parallel to the sides 15B so that the central hole of the washer engages around the shank 19 of the stud. The washer 17 is then rotated through 90° so that opposite side portions of the washer 17 are moved under the two wide end parts 15S of the head 15, thereby fully jamming it under the head 15. The final step consists of bending back down the displaced edge portion 22 of the washer to the level of the remainder of the washer 17.

Thus, each tile can be fixed to the wall by means of one or more fixing studs 13 and a respective washer 17. It will be noted that this fixing arrangement is not permanent, as it is always possible to raise the edge portion 22 of the washer 17 and remove the washer from under the head 15 of the fixing stud 13, thereby enabling each tile 1 to be quickly demounted if required.

In the second embodiment shown in FIGS. 4 and 5, a fixing stud 30 is welded at the foot of its shank 37 to the tile 2, but is arranged to be fixed to the inner surface 10 of the wall 1.

Accordingly, its height is shorter than that of the stud 13 in the first embodiment, and it also has a widened head 31, the upper surface 31S of the head 31 being intended to contact the inner surface 10 of the wall 1. To maintain this contact, a slotted-socket 32 for receiving the head 31 is welded to the inner surface 10 of the wall 1. This socket 32 has a vertical portion 34 by which it is welded to the wall 1, and a horizontal flange portion 33 for location under the head 31 and having an opening or slot 36 defined by means of an inner edge 33I of the flange for receiving the shank 37 of the stud 30 and allowing the head to be inserted into the socket 32.

FIG. 4 shows that the head of the stud 30 is inserted into the socket 32 from right to left, i.e. from downstream to upstream. Retaining the tile in this position is effected by means of a stop 38 inserted through a longitudinal hole 35 in the wall 1 to block removal of the stud from the socket 32. This hole 35 is sited eccentrically relative to the axis of the stud when the latter is received in the socket, and in the region of the entrance to the slot 36. As FIG. 5 shows, the head 31 of the stud 30 has a flat side 40 at its rear edge relative to the direction in which it must be introduced into the socket 32, and this flat side 40 is abutted by a flat side of the shank 39 of the stop 38 projecting through the wall 1 from the outside.

In this embodiment the plate 20 of the tile has spikes similar to the spikes 3 of the first embodiment for slowing down the flow of air between the wall 1 and tile 2 and increasing the effect of this flow by promoting the heat exchange between the tile and the air.

The stud 30 may be made lighter by providing a recess 41 in its shank, and it may even have a central opening 42 to form a heat bridge. The same applies to the stud 13 of the first embodiment, which may also have a recess 14 and an opening 42 for ensuring its thermal inertia.

It will be readily appreciated that it is possible to cover the whole of the inner surface 10 of the stepped combustion chamber wall 1 with a large number of overlapping tiles 2 fixed in a removable manner by either the two embodiments just described in the present specification. Furthermore, it will be appreciated that various modifications of these embodiments can be envisaged without departing from the scope of the invention as defined by the following claims.

We claim:

1. An arrangement for removably fixing a thermal protection tile on the inside of a combustion chamber wall, said tile including a plate portion, the arrangement comprising:

at least one stud fixed to said plate portion, said stud having a shank by which said stud is fixed to said plate portion and a flat head spaced outwardly from said plate portion, said head projecting laterally from said shank;

a socket fixed to the inner surface of said combustion chamber wall, said socket having a shape which corresponds to that of said head of said stud and having means defining an opening at one side thereof to permit entry of said head into said socket to attach said stud, and hence said tile, to said wall;

means defining a hole in said combustion chamber wall positioned eccentrically relative to the axis of said stud when said head is received in said socket; and a stop which is inserted into said hole from outside said combustion chamber wall, said stop having a portion which protrudes from said inner surface of said wall to abut an edge of said head of said stud in said socket and thereby secure said head in said socket.

2. A fixing arrangement according to claim 1, wherein said hole is oblong, and the shape of said head is such that said edge which is abutted by said portion of said stop protruding through said hole is flat.

3. A fixing arrangement according to claim 1, wherein said tile has spikes provided on the outer surface of said plate portion facing said combustion chamber wall for improving heat exchange between said tile and air which, in use, flows between said combustion chamber wall and said tile.

* * * * *